United States Patent

Paddington

[15] 3,695,635
[45] Oct. 3, 1972

[54] PIPE COUPLING

[72] Inventor: Arthur L. Paddington, Thorpe Willoughby, near Selby, England

[73] Assignee: British Ropes Limited, Doncaster, Yorkshire, England

[22] Filed: Sept. 1, 1970

[21] Appl. No.: 68,718

[52] U.S. Cl. ............... 285/38, 285/320, 285/406, 285/420
[51] Int. Cl. ............................................. F16l 35/00
[58] Field of Search........ 285/38, 308, 364, 420, 406, 285/320, 18

[56] References Cited

UNITED STATES PATENTS

| | | | |
|---|---|---|---|
| 1,910,706 | 5/1933 | Malzord | 285/38 X |
| 2,645,506 | 7/1953 | Sturgis | 285/364 X |
| 3,489,434 | 1/1970 | Haley | 285/420 X |

FOREIGN PATENTS OR APPLICATIONS

| | | | |
|---|---|---|---|
| 668,745 | 7/1929 | France | 285/364 |
| 1,050,139 | 2/1959 | Germany | 285/364 |
| 644,493 | 7/1962 | Canada | 285/364 |
| 1,559,425 | 1/1969 | France | 285/320 |

*Primary Examiner*—Dave W. Arola
*Attorney*—Brady, O'Boyle & Gates

[57] ABSTRACT

A quick-release pipe coupling comprises a hollow cylindrical body having a collar axially slidable thereon and supporting a plurality of hooks for engaging the flange of a pipe to be coupled to the hollow cylindrical body, and an annular thrust member mounted on the body adjacent to the collar and in screw-threaded engagement with the body, so that rotation of the thrust member causes axial displacement of the collar and forces the hooks to clamp the flanged pipe against the body.

5 Claims, 14 Drawing Figures

INVENTOR
ARTHUR L. PADDINGTON
BY Brady, O'Boyle & Gates
ATTORNEYS

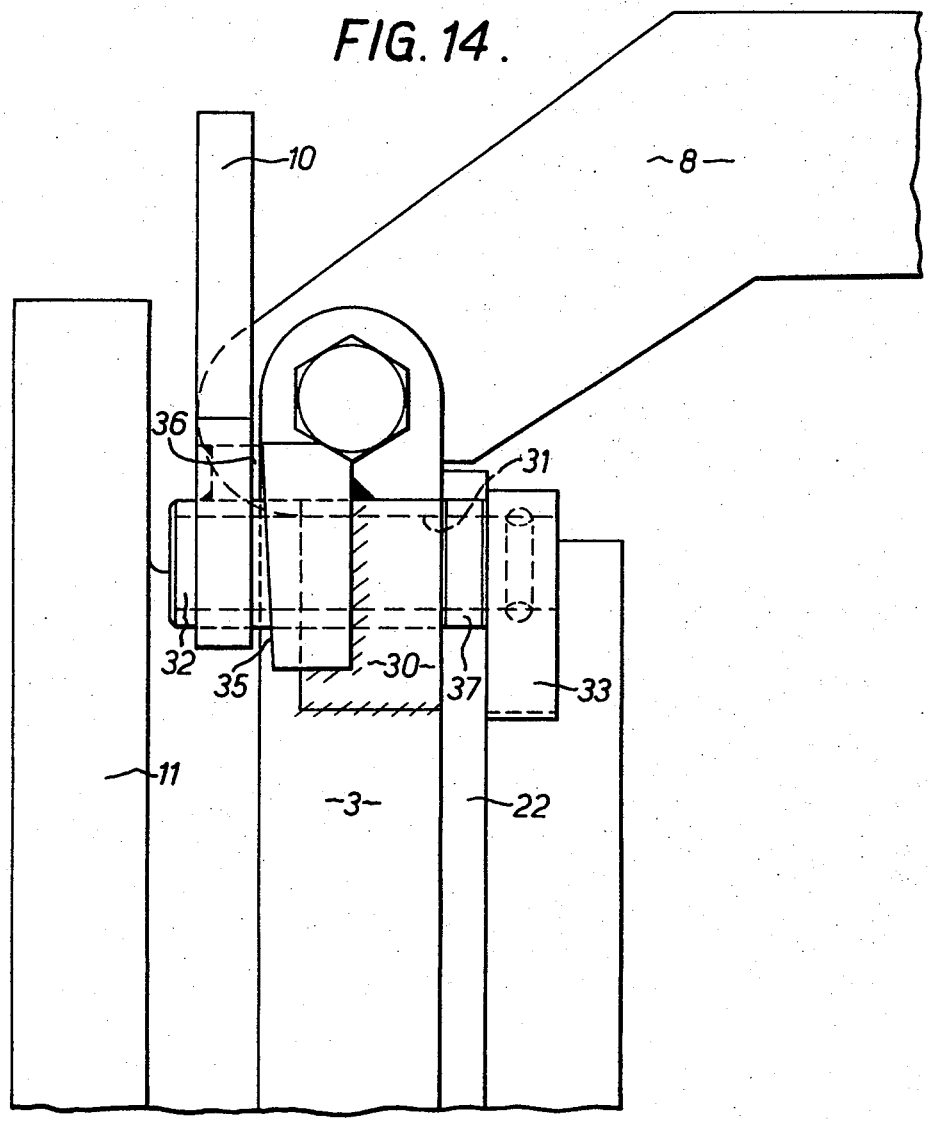

PIPE COUPLING

The invention relates to coupling means and more particularly, but not exclusively, to pipe coupling means.

It is an object of the invention to provide coupling means which can be readily engaged and disengaged.

According to the invention there is provided coupling means comprising a body having mounted and axially slidable thereon a support formed with a plurality of arms arranged to engage a member to couple the member to the body, at least one of the arms being radially movable relative to the body, and means for moving the support axially along the body whereby the member can be clamped against the body.

Preferably the body is a pipe. Said member may be another pipe or a blanking plate. The pipe or pipes are preferably flanged, said arms being arranged to engage behind a flange on the second pipe or behind a blanking plate.

The support may conveniently comprise a collar mounted on the body. The arms may comprise hooks, at least one of which is pivoted to the collar so that it can be swung away from the body. Means are preferably provided for locking the or each pivoted hook in its operative position. The other hook or hooks may be fixedly mounted on the collar.

Said means for moving the support may comprise a thrust member mounted on the body adjacent the collar and in screw-threaded engagement with the body whereby rotation of the thrust member causes axial movement of the collar relative to the body.

Preferably means is provided for preventing rotation of the support on the body.

Advantageously means is provided for locking the collar and thrust member together, when the coupling means is in its working position, to prevent accidental disengagement of the coupling means. The locking means may comprise a pin mounted on the collar and having a part arranged to engage a flange formed on the thrust member, the pin being arranged so that rotation thereof causes axial displacement of the pin so that said part frictionally engages the flange. The means for causing axial displacement of the pin may be a pair of face cams.

The invention is diagrammatically illustrated by way of example in the accompanying drawings wherein like parts have been given the same reference numerals and in which:

FIG. 14 is a side view of the member shown in FIG. 13.

Figure 1:
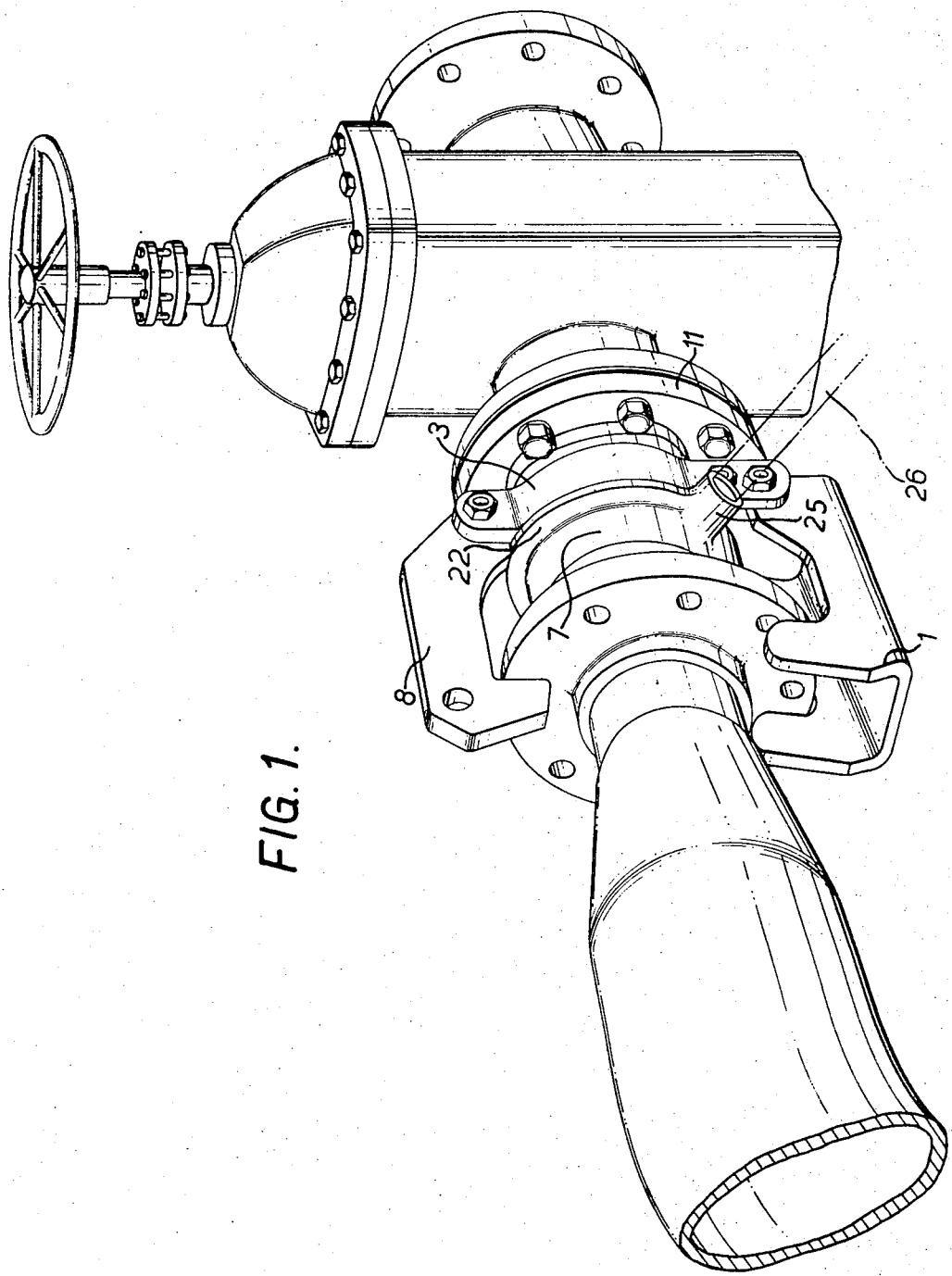
FIG. 1 is a perspective view of a pipe coupling according to the invention.
Figure 2:
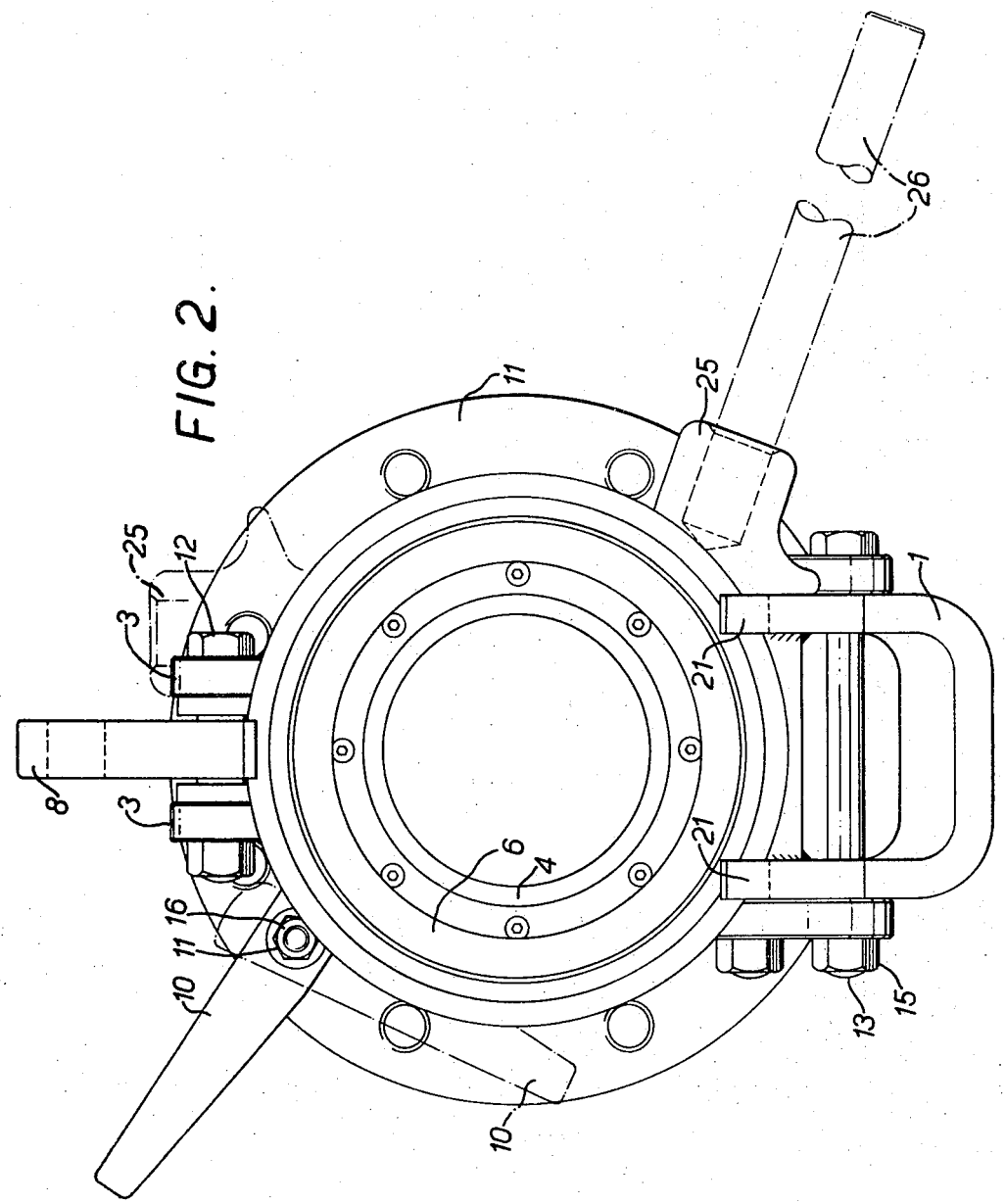
FIG. 2 is an end view of the coupling shown in FIG. 1.
Figure 3:
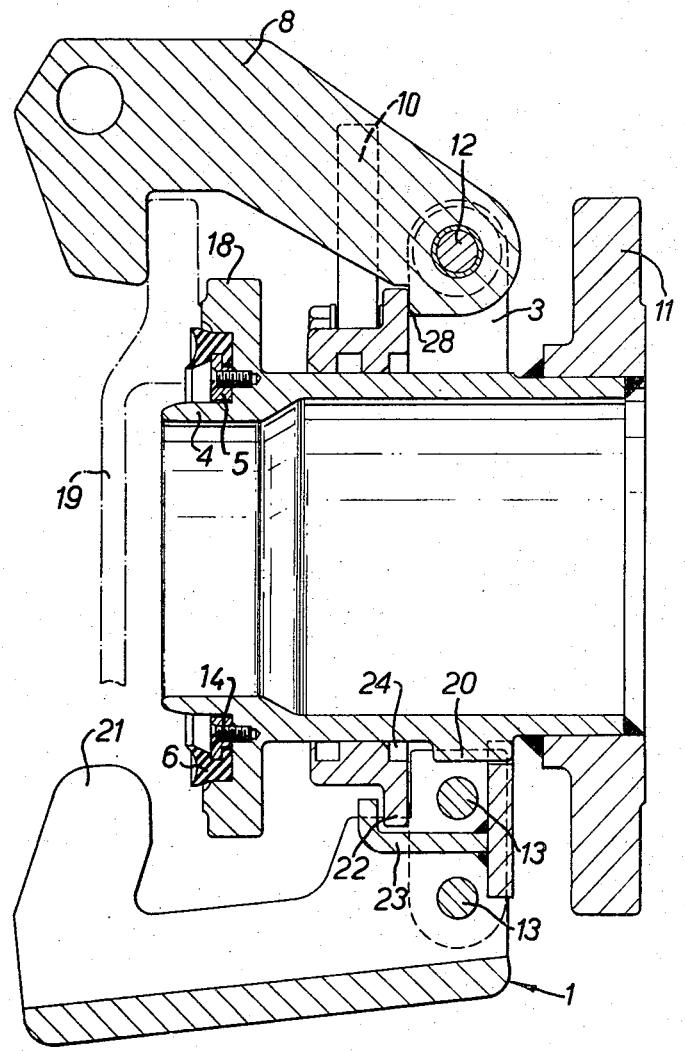
FIG. 3 is an axial section through the coupling shown in FIG. 2 taken in its position of operation.

Referring to FIGS. 1 to 7 of the drawings there is shown a pipe coupling comprising a tubular body 4 formed at one end with an annular flange 11 by means of which the coupling can be secured to a flanged pipe, and at its other end with an annular flange 18 against which the flange of, for example, a further length of pipe can be clamped in order to connect together two lengths of pipe. FIG. 3 of the drawing shows a chain dotted lines a blanking plate 19 clamped against the flange 18 of the pipe coupling but it will be appreciated that a flanged pipe can be connected to the coupling in the same manner. The flange 18 is provided at its surface arranged to engage the flange of an adjacent pipe with a resilient annular fluid seal 6, e.g. of neoprene, secured to the flange by screws 14 and a retaining ring 5.

Between the two end flanges 11 and 18 on the body 4 is arranged an annular collar 3 which can slide axially along the body but which is restrained from rotation on the body by means of a projection 20 provided on the body. The collar is formed by a pair of semi-circular members which are bolted together at their ends, and carries a pair of diametrically opposed hook members 1 and 8 respectively, the hook member 1 being secured to the collar by means of a pair of bolts 13 so that it is stationary relative to the collar, the bolts also serving to connect together the two parts of the collar. As shown in FIG. 3 the hook 1 is U-shaped in cross-section and comprises a spaced pair of hook portions 21. The hook 8 is mounted on the collar by means of a single bolt 12 which also connects together the two parts of the collar and is arranged so that it can pivot about the bolt 12. A shoulder 28 is formed on the hook 8 and, when the coupling is in use, is engaged by an adjacent member 22, more fully described below, so that the hook member is prevented from rotation away from the end flange 18.

A thrust member in the form of an operating barrel 7 is arranged on the outside of the body adjacent the collar, the operating barrel being formed adjacent the collar 3 with an outwardly extending annular flange 22 (constituting the aforesaid member 22). A hooked member 23 is mounted on the collar 3 and engages the flange 22 so that the collar and the operating barrel are connected loosely together for axial movement along the body 4, but are capable of relative rotation. The inner surface of the operating barrel is formed with a buttress thread 24 which engages with corresponding projections 24' (FIG. 3) formed on the external surface of the body, whereby rotation of the operating barrel causes axial movement of the barrel, and thus the collar 3, along the body. For this purpose the operating barrel is formed with a socketed projection 25 into which an operating lever 26 may be inserted so that the operating barrel can be rotated relative to the body.

Figure 5:
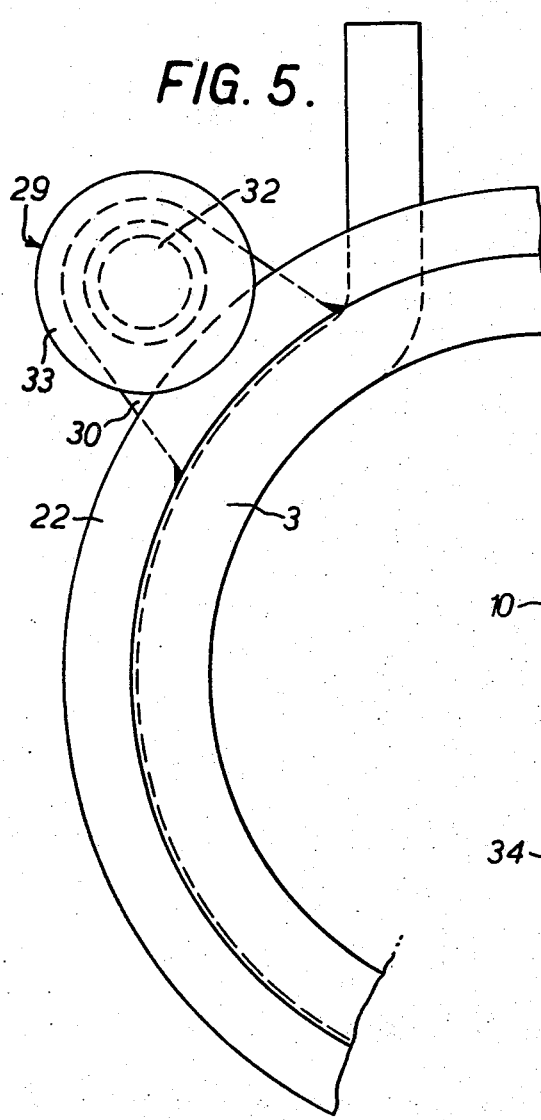
FIG. 5 is a scrap view of part of the coupling shown in FIG. 2 and showing a locking device.
Figure 6:
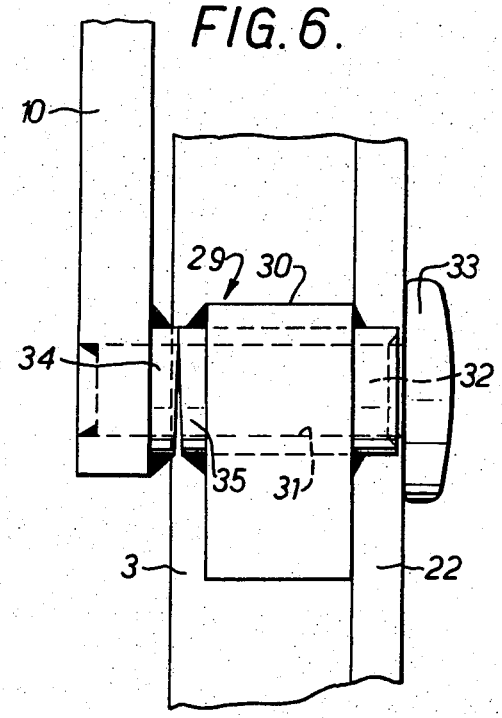
FIG. 6 is a side view of the device shown in FIG. 5.
Figure 7:
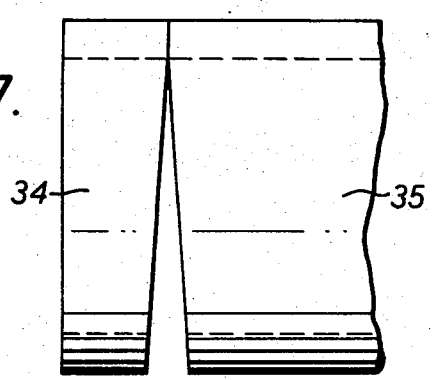
FIG. 7 is an enlarged view of part of the device shown in FIG. 6.

As shown more particularly in FIGS. 5 to 7 a locking member 29 is mounted on the collar 3, the locking member comprising a housing 30 formed with a cylindrical bore 31 in which is slidably mounted a pin 32. The pin 32 has secured to one end thereof an operating lever 10 and to the other end thereof a friction pad 33. The adjacent surfaces of the operating lever and the housing 30 are formed with cooperating face cams 34 and 35 respectively whereby on rotation of the lever 10 the pin is drawn to the left as shown in FIG. 6 so as to bring the friction pad 33 into engagement with the flange 22 of the operating barrel and thus to lock the collar and operating barrel together. In this respect, it will be appreciated that though the two members are connected together by the hook member 23, the member 23 is arranged such that some degree of axial movement can take place between the two members. The arrangement is such that after locking of the collar to the barrel, any tendency of the barrel to rotate in a direction to disengage the coupling causes the friction pad to engage the flange 22 more tightly, without however jamming the locking mechanism to prevent release thereof.

Figure 4:
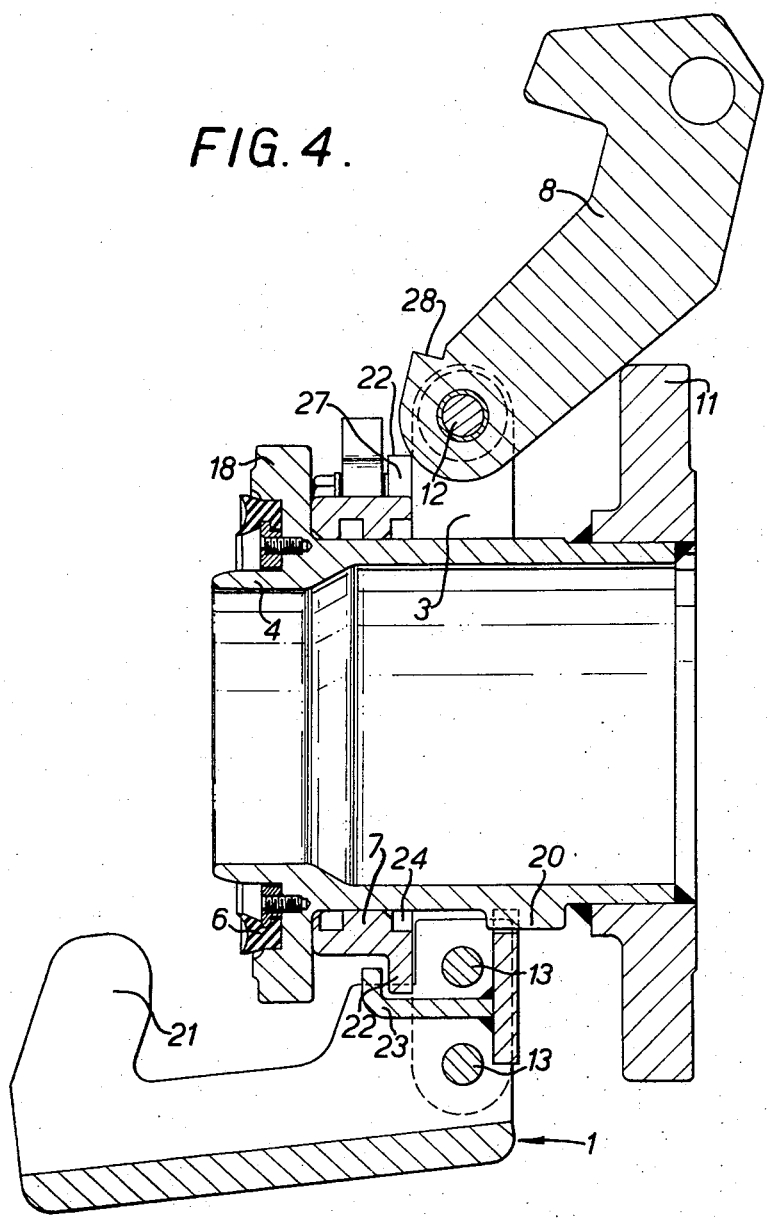
FIG. 4 is an axial section similar to FIG. 3 but in its inoperative position.

In operation the coupling is first arranged in the position shown in FIG. 4 that is to say the operating barrel is rotated to bring the barrel towards the flange 18, the hook member 8 being swung into a position remote from flange 18. For this purpose a cut-out portion 27 is provided in the flange 22 so that when the shoulder 28 is aligned with the cut out portion 27, the hook 8 may be swung outwardly to the position shown in FIG. 4.

The flange of the pipe to be coupled is then manouvered into position and is located on the lower fixed hook member 1. As the hook member 1 is bifurcated, it can provide a stable support or cradle for the pipe to be coupled. The pivoted hook member 8 is then swung into the position shown in FIG. 3 so that it engages behind the flange of the pipe to be coupled. The operating barrel 7 is then rotated by means of the lever 26 to move the collar to the right as viewed in FIG. 3 so that the hook members 1 and 8 clamp the flange of the pipe to be coupled firmly against the flange 18 (as shown in FIG. 4). The seal 6 is thus compressed between the adjacent flanges of the pipe and coupling to form a fluid tight seal between the coupling and the pipe. As previously indicated, the hook member 8 is prevented from swinging outwards by engagement of the flange 22 with the shoulder 28. Lastly the locking member 29 is operated by turning the pin 32 by means of the lever 10, so that the pad 33 frictionally engages the flange 22 of the operating barrel 7 and prevents accidental loosening of the coupling. The coupling can be disconnected simply by loosening the locking device by rotating the lever 10, loosening the operating barrel by rotating it to move it in the direction of the flange 18, swinging the pivoted hook 8 upwardly out of contact with the flange of the pipe, and then lifting the pipe clear of the coupling.

Figure 8:
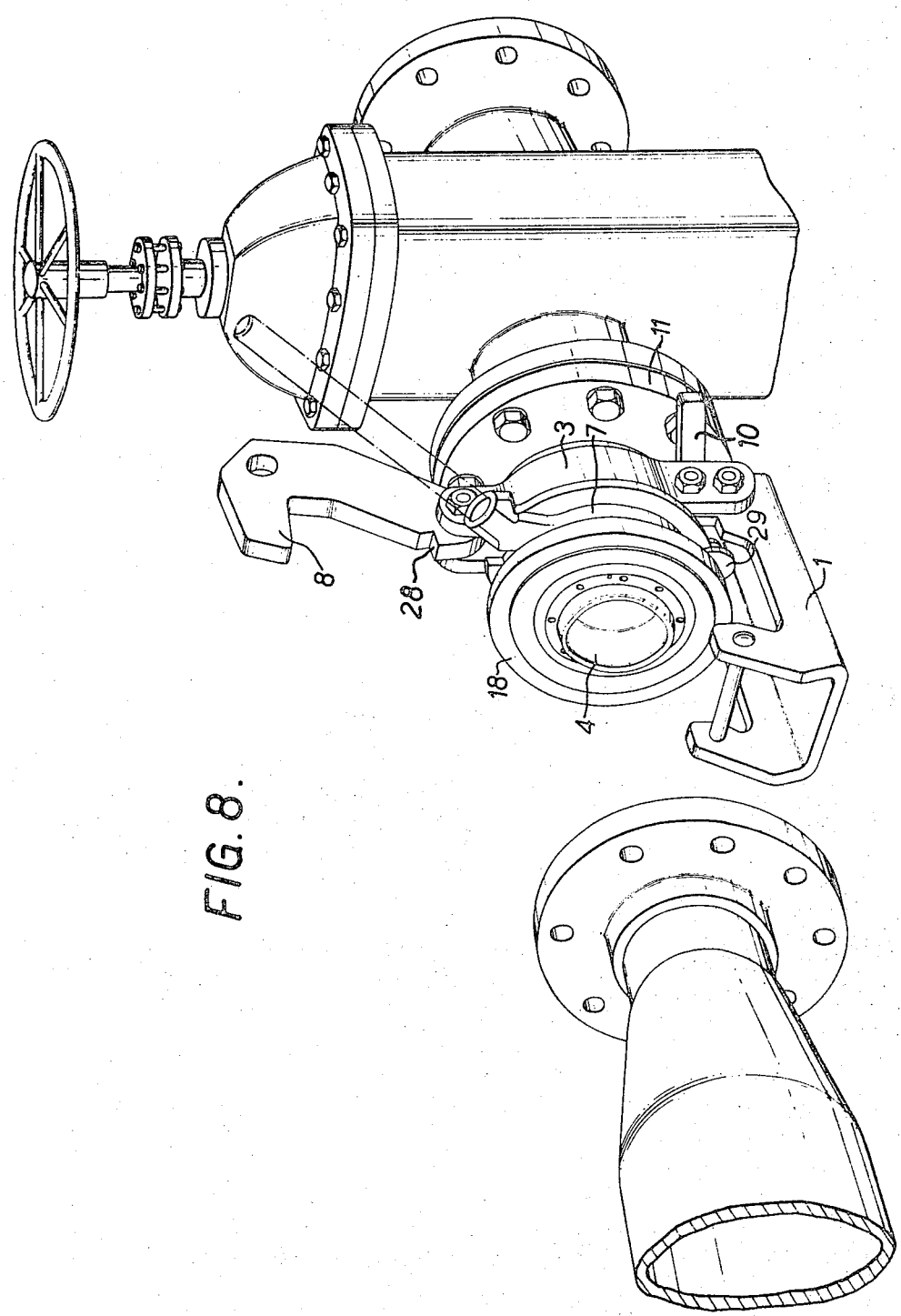
FIG. 8 is a perspective view of a modified pipe coupling in its disengaged position.
Figure 9:
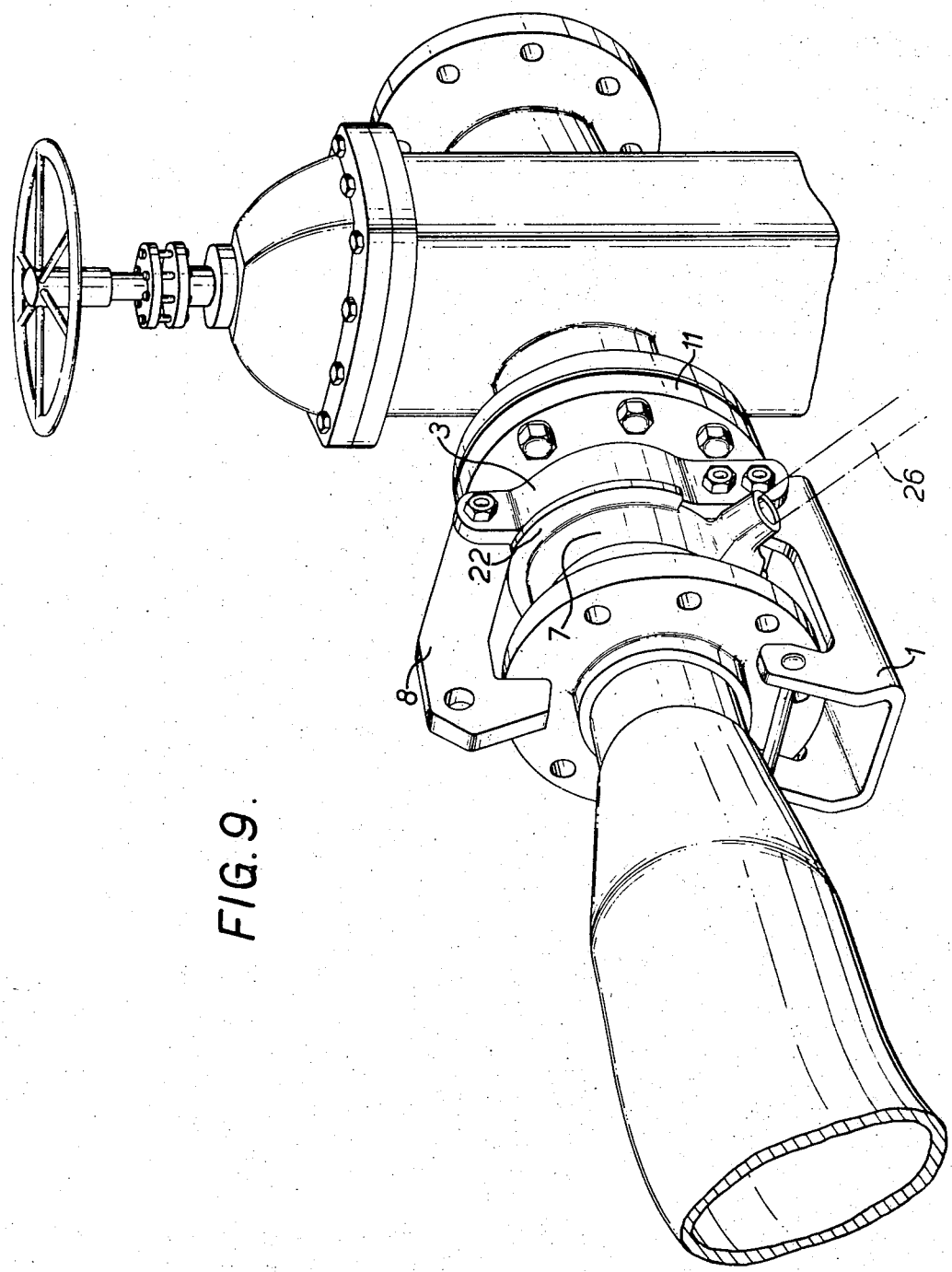
FIG. 9 is a perspective view similar to FIG. 8 but with the coupling in its engaged position.

FIGS. 8 and 9 show a pipe coupling of the kind shown in FIGS. 1 to 4 of the drawings and wherein a locking member 29 of the kind generally shown in FIGS. 5 to 7 is disposed on the collar 3 adjacent the fixed hook 1.

Figure 10:
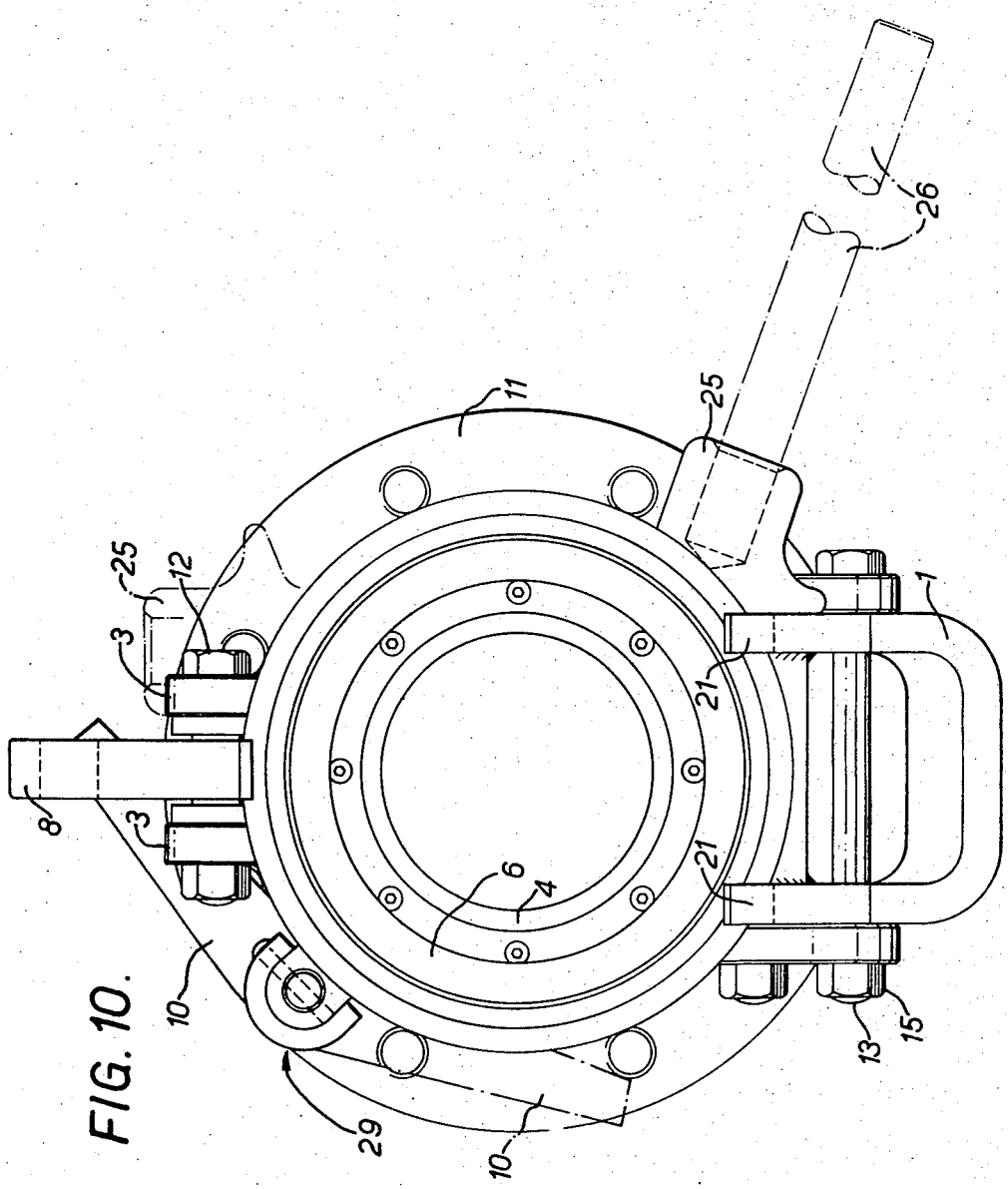
FIG. 10 is an end view of a coupling generally similar to that shown in FIG. 2.
Figure 11:
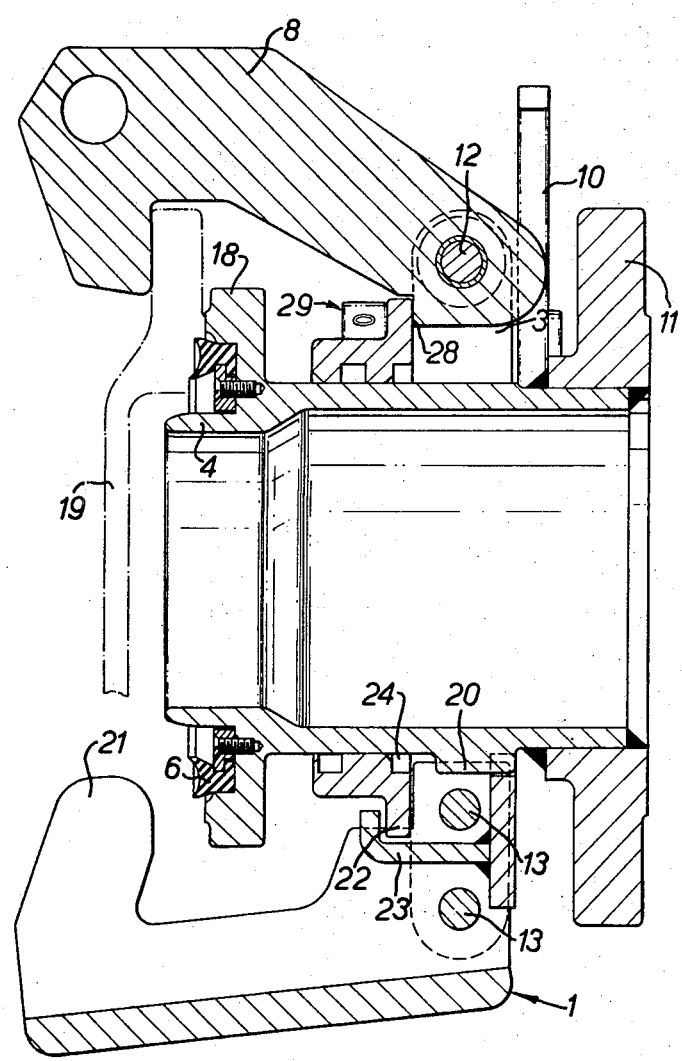
FIG. 11 is an axial section through the coupling shown in FIG. 10.
Figure 12:
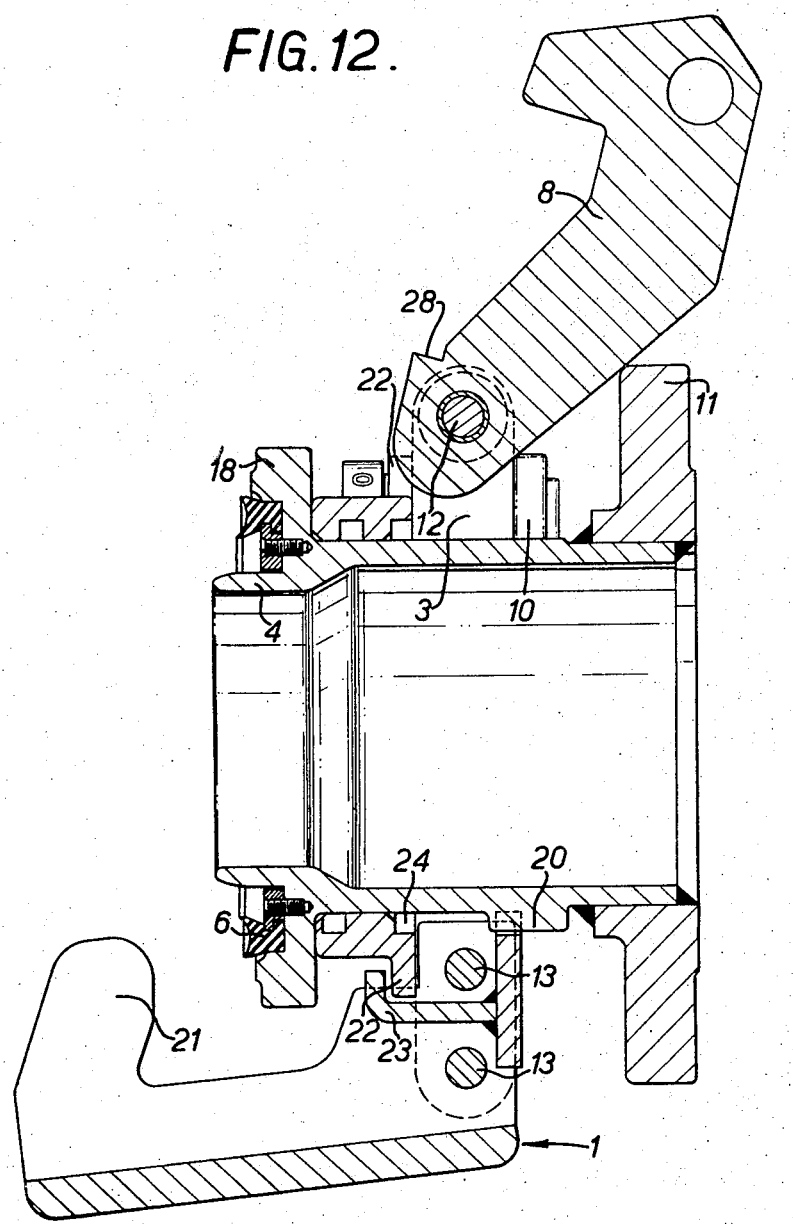
FIG. 12 is a further axial section of the coupling shown in FIGS. 10 and 11.
Figure 13:
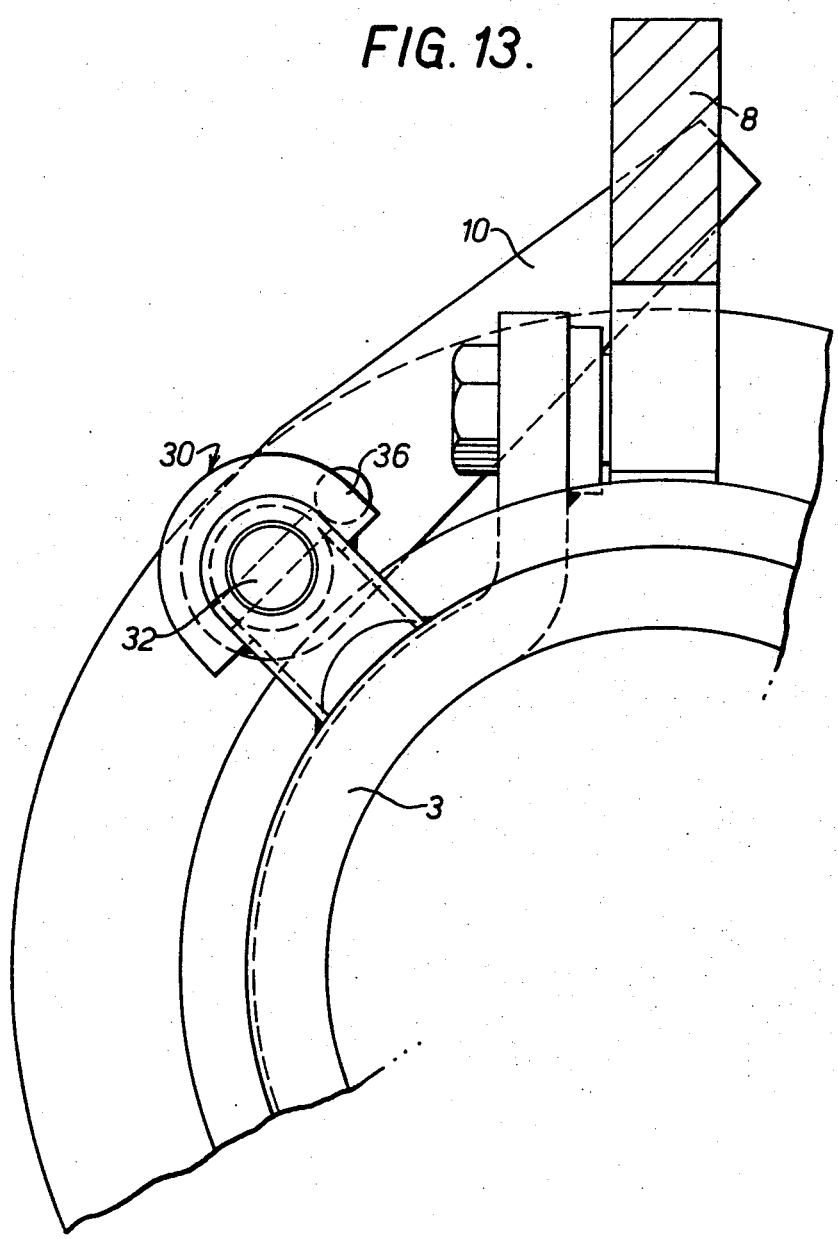
FIG. 13 is an end elevation of a locking member.

FIGS. 10 to 12, which correspond to FIGS. 2 to 4 respectively, show the locking member 29 disposed on the collar 3 adjacent to the pivoted hook 8. The locking member is more fully illustrated in FIGS. 13 and 14 and is generally similar to that shown in FIGS. 5 to 7.

The locking member 29 comprises a housing 30 welded to the collar 3, the housing being formed with a cylindrical bore 31. A pin 32 is slidably mounted in the bore 31 and has secured to one end thereof an operating lever 10 and to the other end thereof a friction pad 33. The end of the housing adjacent to the lever 10 is formed with a face cam surface 35 against which a follower 36 provided on the lever 10 can bear, so that rotation of the pin 32 via the lever 10 causes axial displacement of the pin and thus the friction pad 33 for the purpose described above with reference to FIGS. 5 to 7. A spacer 37 is provided on the pin between the housing 30 and the friction pad 33, to limit displacement of the friction pad to the left as viewed in FIG. 14.

I claim:

1. Coupling means comprising a hollow body, a support collar mounted on the body so as to be axially slidable thereon, means for preventing rotation of the collar relative to the body, a plurality of hooked arms mounted on the collar and at least one of which is pivotable relative thereto, the arms being adapted to engage behind a flange on a hollow member whereby the member can be clamped against the body, a thrust member mounted on the hollow body in contact with the collar and in screw-threaded engagement with the body, whereby rotation of the thrust member relative to the body causes axial movement of the collar along the body to effect said clamping, and means for locking the collar and thrust member together comprising a pin slidably mounted on the collar so as to be movable axially thereof and having a part arranged to engage a flange formed on the thrust member, means for axially displacing the pin whereby the said part frictionally engages the flange.

2. Coupling means according to claim 1, wherein each pivoted hooked arm is formed with a shoulder adapted to engage the flange of the thrust member when the hooked arm is in its operative position whereby the said arm is locked against pivotal movement, the flange being formed with a recess which aligns with the shoulder to permit pivotal movement of the hooked arm when the thrust member is in its inoperative position.

3. Coupling means according to claim 1, wherein the means for axially displacing the pin comprises face cam means operatively connected to said pin, said cam means having relatively rotatable portions for axially displacing the pin whereby the said part frictionally engages the flange, and means for relatively rotating the portions of the face cam.

4. Coupling means according to claim 3, wherein each pivoted hooked arm is formed with a shoulder adapted to engage the flange of the thrust member when the hooked arm is in its operative position whereby the said arm is locked against pivotal movement, the flange being formed with a recess which aligns with the shoulder to permit pivotal movement of the hooked arm when the thrust member is in its inoperative position.

5. Coupling means comprising a hollow body having a cylindrical portion, a support collar mounted on the cylindrical portion of the body so as to be axially slidable thereon, means for preventing rotation of the collar relative to the body, a plurality of hooked arms mounted on the collar and at least one of which is pivotable relative thereto, the arms being adapted to engage behind a flange on a hollow member whereby the member can be clamped against the body, an annular thrust member mounted on the cylindrical portion of the hollow body in contact with the collar and in screw-threaded engagement with the body, whereby rotation of the thrust member relative to the body in one direction causes axial movement of the collar along the body to effect said clamping, an annular flange being formed on the thrust member and each pivoted hooked arm being formed with a shoulder adapted to engage the flange of the thrust member when the hooked arm is in its operative position whereby the said arm is locked against pivotal movement, the flange being formed with a recess which aligns with the shoulder to permit pivotal movement of the hooked arm when the thrust member is in its inoperative position and means for locking the collar and thrust member together comprising a pin slidably mounted on the collar so as to be movable axially thereof and having a head arranged to engage the said flange on the thrust member, face cam means having relatively rotatable portions one of which portions is secured to the pin and the other of which portions is fixedly mounted on the collar, and lever means for relatively rotating the portions of the face cam to displace the pin axially to engage the head thereof frictionally with the flange on the thrust member.

* * * * *